United States Patent [19]
Fayling

[11] B 3,995,313
[45] Nov. 30, 1976

[54] DATA ACCUMULATION SYSTEM

[75] Inventor: Richard E. Fayling, White Bear Lake, Minn.

[73] Assignee: Minnesota Mining and Manufacturing Company, St. Paul, Minn.

[22] Filed: Aug. 28, 1972

[21] Appl. No.: 283,941

[44] Published under the second Trial Voluntary Protest Program on February 3, 1976 as document No. B 283,941.

Related U.S. Application Data
[62] Division of Ser. No. 284,071, Aug. 28, 1972.

[52] U.S. Cl. .................................. 360/15; 360/16
[51] Int. Cl.² ............................................ G11B 5/86
[58] Field of Search .............. 179/100.2 E; 360/15, 360/16

[56] References Cited
UNITED STATES PATENTS

| | | | |
|---|---|---|---|
| 3,037,090 | 5/1962 | Bouzemburg | 179/100.2 E |
| 3,341,854 | 9/1967 | Supernowicz | 179/100.2 E |
| 3,401,394 | 9/1968 | Leonard et al. | 346/74 |
| 3,496,304 | 2/1970 | Nelson | 179/100.2 E |
| 3,571,527 | 3/1971 | Becker et al. | 179/100.2 E |
| 3,617,648 | 11/1971 | Irving | 179/100.2 E |

Primary Examiner—Vincent P. Canney
Attorney, Agent, or Firm—Alexander, Sell, Steldt & DeLaHunt

[57] ABSTRACT

A system using a recording medium for accumulating data to be fed to electronic data processing equipment. The system includes homogeneous permanent magnet material master source documents capable of being magnetized throughout in discrete patterns providing external magnetic fields representative of encoded data. The permanent magnet material has a coercivity of not less than 1000 oersteds and a maximum energy product of not less than $5 \times 10^5$ gauss-oersteds. The data is recorded onto a recording medium momentarily positioned adjacent the documents. The data is subsequently sensed from the recording medium to produce electrical signals to be processed in data processing equipment. In one embodiment customer and transaction data are magnetically recorded onto the recording medium.

6 Claims, 21 Drawing Figures

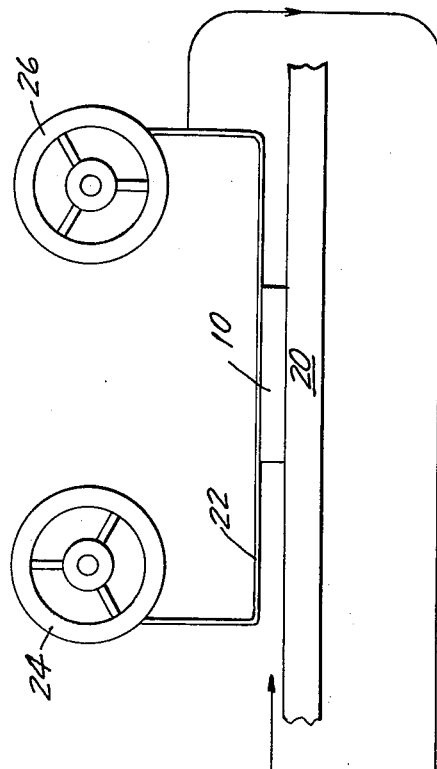
FIG. 1A
FIG. 1B
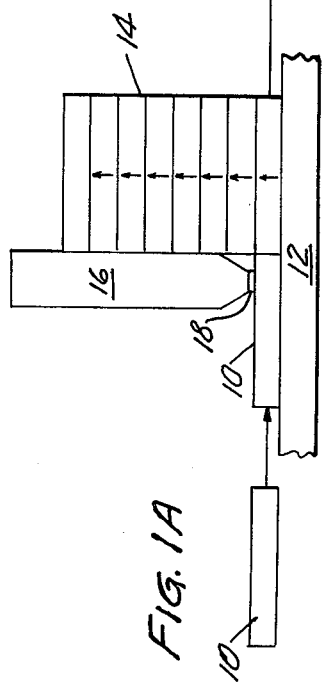
FIG. 1C
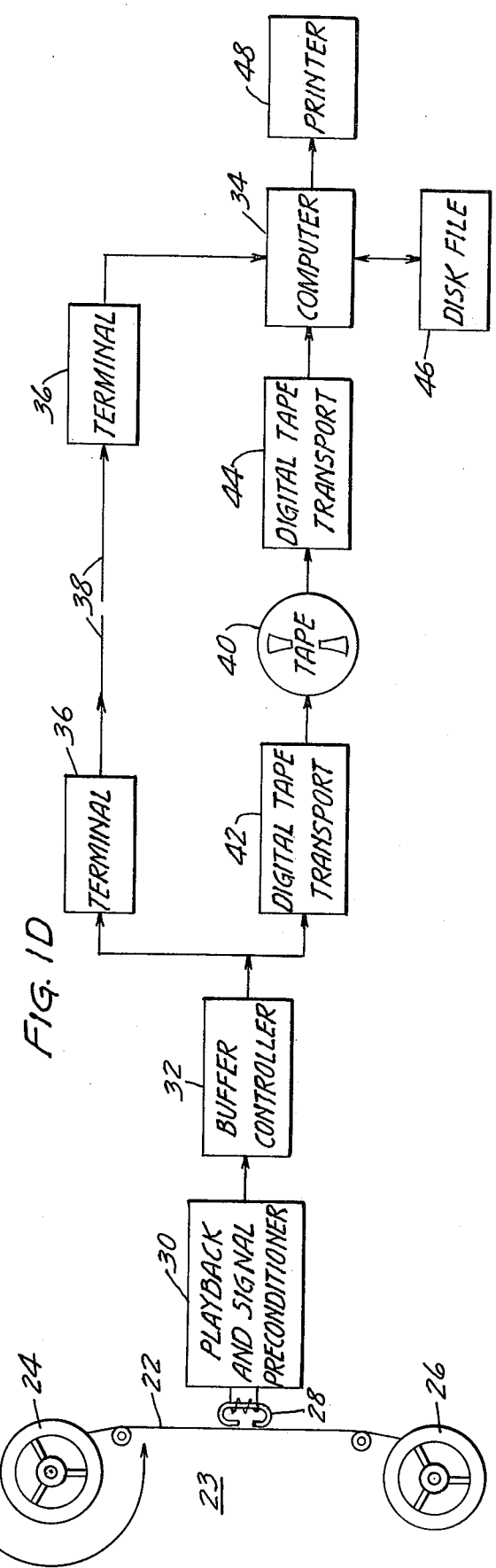
FIG. 1D

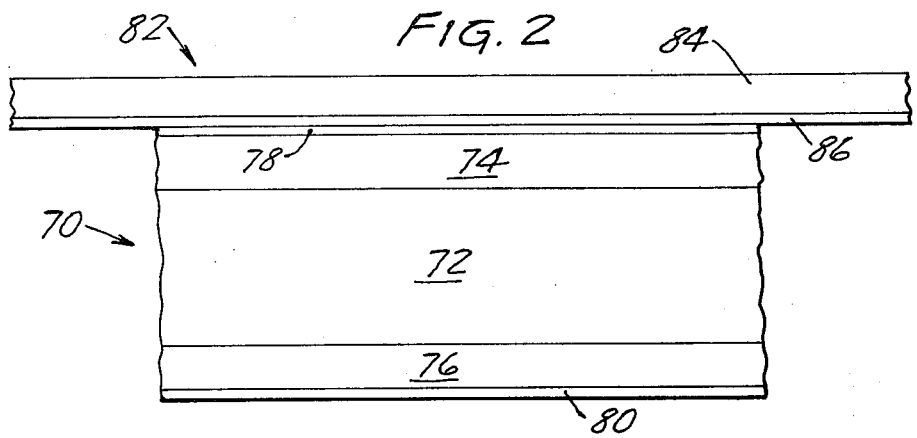
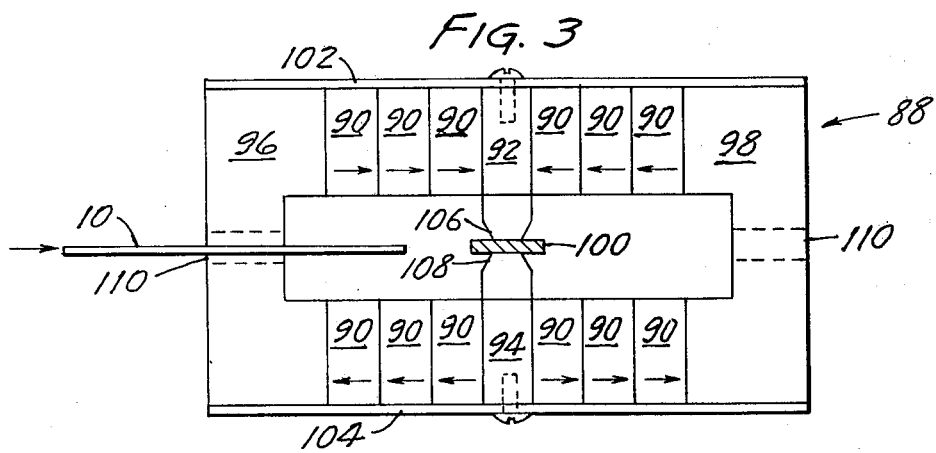
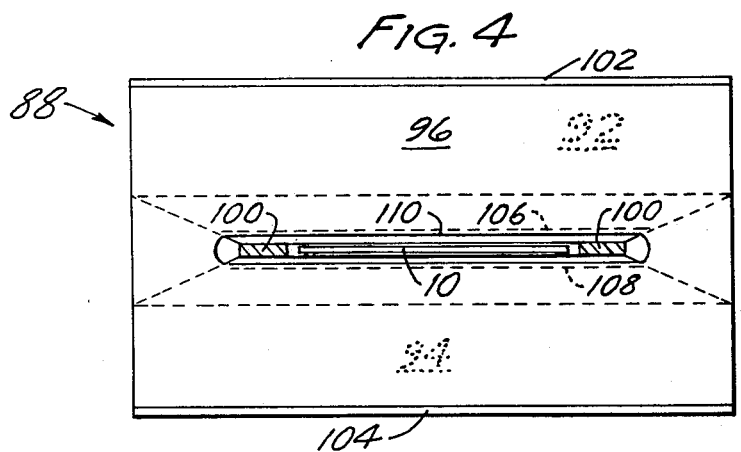

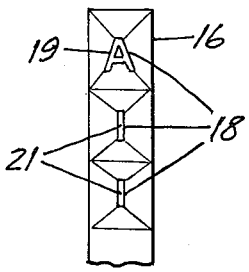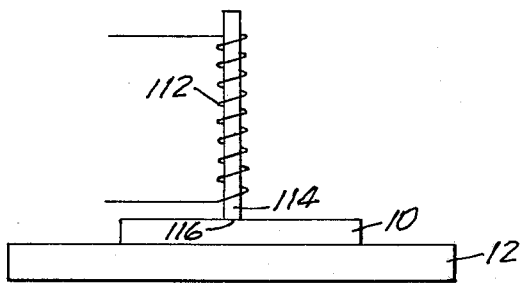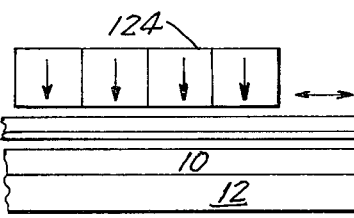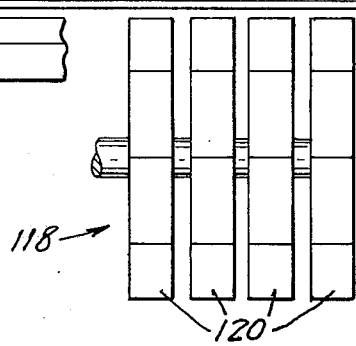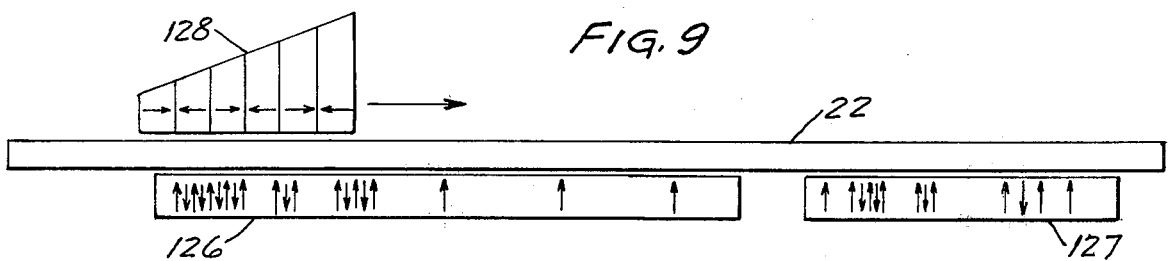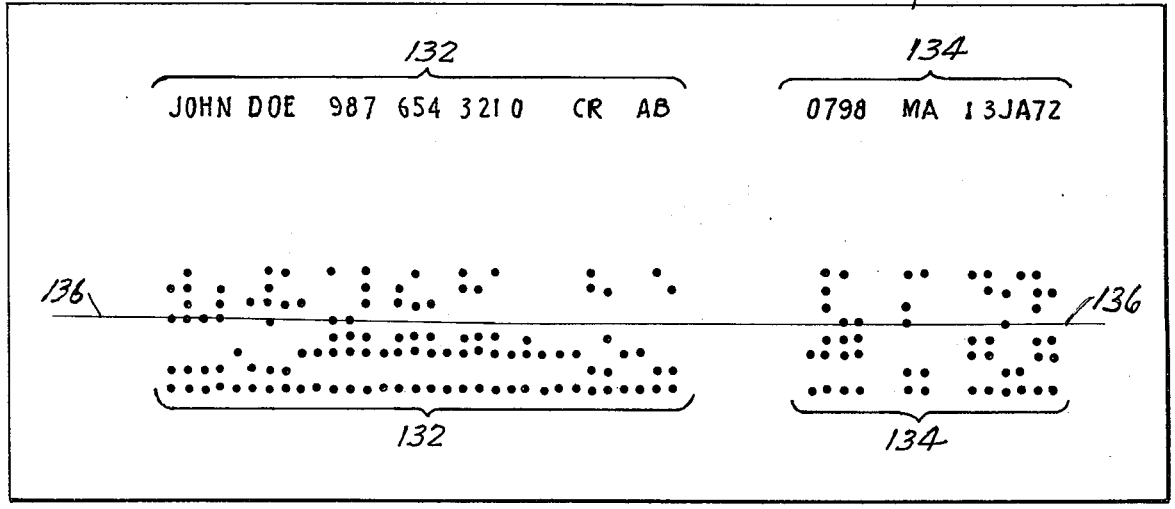

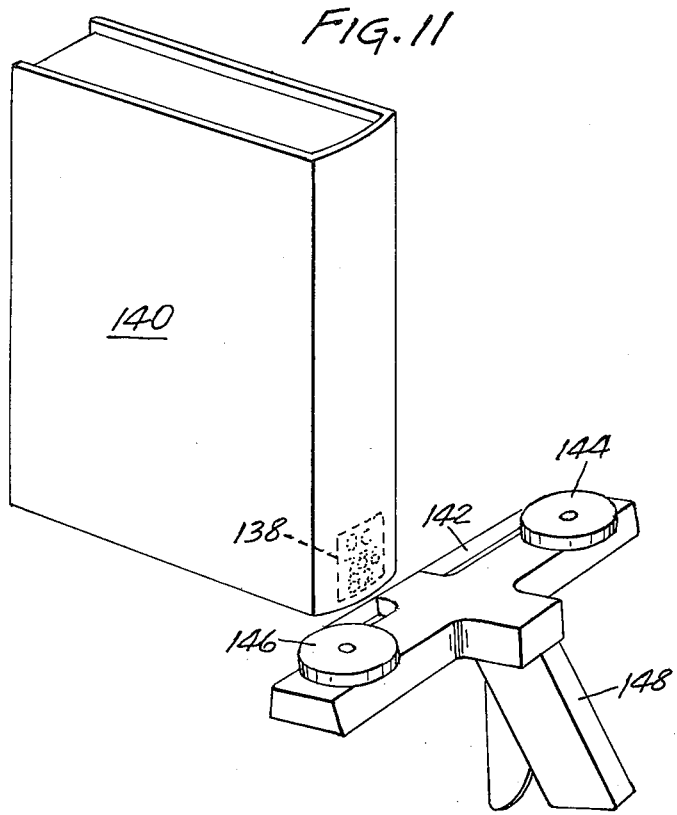
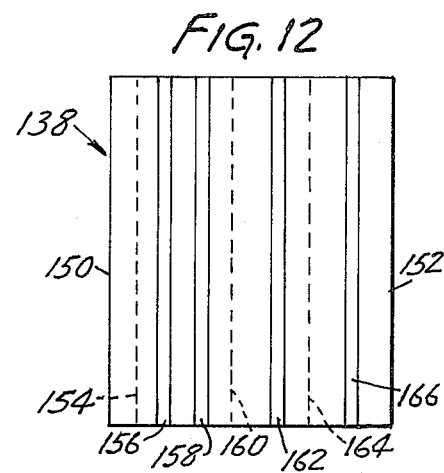
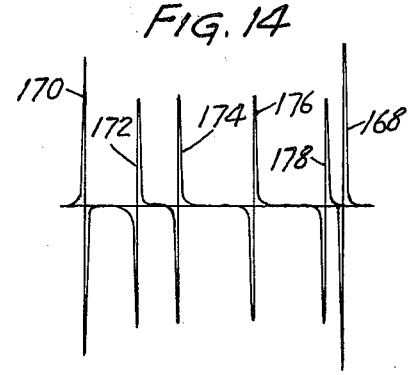
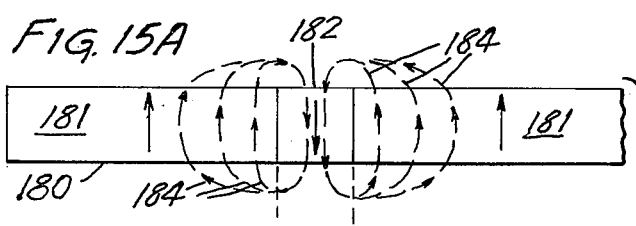
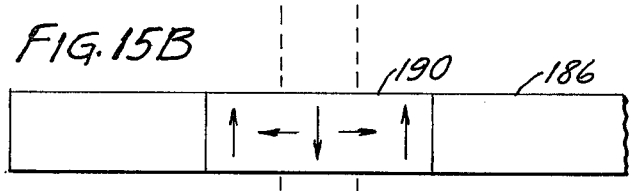
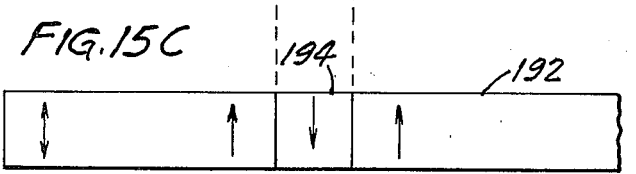
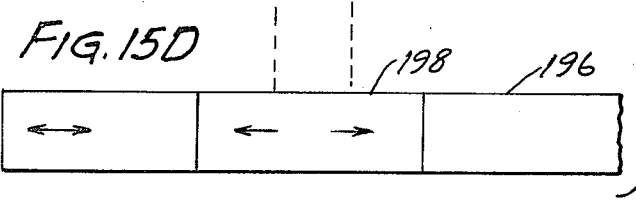

DATA ACCUMULATION SYSTEM

CROSS REFERENCE TO RELATED APPLICATION

This application is related to a patent application entitled "Data Accumulation System Providing Magnetic Toner Power Recording" Ser. No. 284,071 filed Aug. 28, 1972 by the inventor herein, and Wayne M. Beebe.

BACKGROUND OF THE INVENTION

There has been a long felt need for an improved system using a recording medium for accumulating data concerning routine transactions to be fed to an electronic computer.

A typical system, disclosed in U.S. Pat. No. 3.401,394, provides as a master source document containing magnetically encoded transaction data, a card containing discrete soft iron slugs molded in an encoded pattern. When magnetic recording tape is placed in contact with the card and a magnet is moved thereover, the flux produced by the magnet is concentrated by the slugs and alters the magnetization in the tape, thereby recording the encoded pattern thereon. The encoded patterns on the recording medium may be subsequently sensed to produce electrical signals for processing in the computer or other data processing equipment. However, such a system requires the card to be encoded at the time of manufacture and does not allow for subsequent insertion of updated information.

Other methods for accumulating encoded data from magnetically encoded sources onto a magnetic recording medium are disclosed in U.S. Pat. Nos. 2,738,383, 3,536,855 and 3,341,854.

SUMMARY OF THE INVENTION

The present invention provides an improved system using a recording medium for accumulating from master source documents data to be fed to electronic data processing equipment, by utilizing master source documents which comprise homogeneous sheets of particulate permanent magnet material in a flexible binder, each sheet having a coercive force of not less than 1000 oersteds and a maximum energy product of not less than $5 \times 10^5$ gauss-oersteds in which data may be encoded throughout by magnetizing the sheet in discrete patterns to provide external magnetic fields representative of the encoded data, and in which the provided fields are permanent and intense.

By providing permanent magnetic fields, the encoded pattern is not susceptible to being inadvertently or ineptly erased; and yet unlike the pattern in the prior art documents containing embedded slugs, the pattern in the homogeneous sheet documents of the present invention, can be intentionally erased and re-encoded in altered form to provide an updating capability. Such documents, when used as customer credit cards or like documents may thus contain quasi-permanent data such as credit rating, account balance and like information which may be altered from time to time, if so desired.

The presence of the intense magnetic fields permits magnetically recording from the master source documents onto a recording medium even though the ferromagnetic sheets in the documents and the magnetically responsive portion of the recording medium are not in direct intimate contact. This capability allows the use of a master source document in which the ferromagnetic data bearing sheet is concealed within outer layers suitable for carrying visible information. Furthermore, recordings may be made even though the positioned documents and the recording medium are slightly apart, such as where the documents are momentarily positioned adjacent the recording medium by means of a thin nonmagnetic carrier web which passes between the positioned documents and the recording medium.

Also, the intense nature of the external magnetic fields provided by the master source documents of the present invention provide the desirable capability of magnetically recording the encoded data onto a recording medium without requiring any such external magnetic bias field or other aid used to enhance the recording process. Notwithstanding the capability of magnetically recording without an external bias field, in one preferred embodiment of the present invention, described hereinafter, an external bias field is used to facilitate recording without having to be concerned about such smearing of the recording as may be produced by lateral relative movement of the positioned documents with respect to the recording medium.

A further advantage of providing a master source document consisting of a homogeneous sheet of ferromagnetic material is that such documents may be simply stamped out of a large sheet of such material.

BRIEF DESCRIPTION OF THE DRAWING

FIGS. 1A through 1D sequentially illustrate steps performed in using the system of the present invention;

FIG. 2 is a cross sectional view of a portion of a master source document placed adjacent a recording medium to record the magnetic patterns in the master source document in the recording medium;

FIGS. 3 and 4 show side and front views respectively of a device for uniformly premagnetizing a master source document;

FIG. 5 is a bottom view of a typical magnetic field concentrating pole face for use with the encoding means depicted in FIG. 1B;

FIG. 6 illustrates an alternative electromagnetic encoding device to that shown in FIG. 1B;

FIG. 7 is a side view of an embodiment for recording customer and transaction data onto a recording medium;

FIG. 8 is an end view of the transaction register presenting transaction data shown in FIG. 7;

FIG. 9 is a side schematic view in elevation of magnetization patterns within a master source document encoded to contain identification data and in a master source document encoded to contain transaction data, together with a recording medium and a preferred bias magnet means;

FIG. 10 illustrates typical magnetization patterns producible in a recording medium;

FIG. 11 is a three dimensional view of an embodiment of the present invention for accumulating data relating to books or similar articles;

FIG. 12 illustrates typical magnetization patterns which may be encoded in master source documents;

FIG. 13 illustrates the master source document of FIG. 12 adjacent a recording medium;

FIG. 14 illustrates typical electrical signals produced from the recording medium of FIG. 13; and FIGS. 15A-D illustrates magnetization patterns produced in a master source document and in various types of recording media.

DESCRIPTION OF THE PREFERRED EMBODIMENTS

A permanent magnet master source document 10 is shown in FIG. 1A. The document 10 is preferably a sheet of oriented barium ferrite in a flexible binder such as is manufactured by Minnesota Mining and Manufacturing Company, Saint Paul, Minnesota under the trade name "Plastiform". Such materials typically have a coercive force in excess of 1400 oersteds and an energy product typically in excess of $10^6$ gauss-oersteds. U.S. Pat. No. 2,999,275, assigned to the assignee of the present invention, discloses a method for producing such a material. The flexible binder may be selected to optimize certain properties such as embossability and dimensional stability which become important in cetain applications such as when the master source documents are used as credit cards. The essential feature of the document construction is that the remanent magnetic strength and coercive force be sufficiently intense to produce an external magnetic field capable of magnetically recording encoded patterns from the document onto a recording medium. For example, document constructions having a coercivity in excess of 1000 oersteds and an energy product in excess of $5 \times 10^5$ gauss-oersteds and thicknesses ranging between 0.25 to 1.5 mm have been found to be suitable in the present invention for use with recording media containing standard iron oxides having a coercive force less than 400 oersteds.

FIG. 1B illustrates a self powered device for encoding the master source document sheet 10. The device comprises a soft iron high permeability base plate 12, which provides a low reluctance flux return path, a source of intense magnetic field 14 and a flux concentrating pole piece 16. The intense magnetic field is provided by a permanent magnet 14, which is conveniently fabricated by laminating a plurality of layers of premagnetized "Plastiform" material together. This field is shunted through the pole piece 16 and through the master source document 10 back to the base plate 12, all of which have a much lower magnetic reluctance than the alternative path for the flux through the surrounding air. Pole piece 16 is further provided with a pole face 18 shaped in the form of an alphanumeric character or machine readable code corresponding to such a character. Pole face 18 concentrates the lines of flux through the source document 10 to produce a field in the document at least equal to that required to change the magnetic state within an area corresponding to the shaped pole face 18, thereby resulting in an encoded discrete pattern within the master source document 10. Customer identity, account number, credit rating and like information can thus be encoded on the document by selection and positioning of appropriately selected pole faces.

A device for recording the encoded patterns within a master source document 10 onto a recording medium 22 is schematically shown in FIG. 1C. In the embodiment shown, the recording medium 22 is a web of conventional magnetic recording tape such as type 200 manufactured by Minnesota Mining and Manufacturing Company. In an alternative embodiment, the recording medium may comprise a magnetizable layer coated on flat card stock such that the encoded patterns in the master source document 10 may be reproduced on a recording medium in the shape of a conventional data processing card for use in card processing devices. A further embodiment, which is the subject of the above cross-referenced copending application by the present inventor and W. M. Beebe, Ser. No. 284,071 filed Aug. 28, 1972 and assigned to Minnesota Mining and Manufacturing Company, utilizes as the recording medium nonmagnetic paper stock. In that embodiment, the encoded patterns on master source documents are magnetically recorded on the paper stock by selective deposition of magnetic toner powders on the outer surface of the paper stock corresponding to the encoded patterns on the master source documents.

In a still further embodiment, the recording medium may comprise a high coercive force permanent magnet material selected to have a coercive force less than that of the permanent magnet material used in the associated master source document so that contact recording onto the recording medium can be achieved. In this embodiment, the recorded medium may contain sufficiently intense encoded magnetic field patterns to function as a duplicate master source document and enable contact recording onto further recording medium.

In a preferred embodiment, the recording medium is machine read, and signals obtained therefrom are processed on conventional electronic data processing equipment. FIG. 1D depicts in block diagrams, a typical means for sensing the encoded pattern on the recording medium to produce electrical signals for processing in electronic data processing equipment. In the embodiment shown, the magnetic recording medium 22 is positioned on a tape transport device 23 having takeup and supply reels 24 and 26 for supporting the tape and having a magnetic pickup head 28 positioned along the path thereof. When a number of parallel tracks are recorded on the recording medium 22, an equal number of magnetic heads 28 are provided. The signal from the head 28 is coupled to a playback and signal preconditioner circuit 30 to convert the signal from the head 28 into a serial signal format representative of individual alphanumeric characters. The output from the signal preconditioner circuit 30 passes through a buffer controller 32 prior to input to an electronic data processing computer 34. Depending whether on or off line data processing is desired, the signals from the buffer controller 32 may pass through terminal equipment 36 and transmission lines 38 directly to the computer 34, or, alternatively may be recorded in a digital tape transport unit 42, and subsequently played back on digital transport unit 44 for input into the computer 34. The input signals may be compared with previously entered data in the computer memory or peripheral disk file 46 and output records printed on an output device such as a printer 48.

A cross sectional view of a preferred embodiment of a master source document 70 is set forth in FIG. 2. The document 70 is shown to comprise a permanent magnet material layer 72 sandwiched between inner layers 74 and 76 and outer covering layers 78 and 80. The inner layers 74 and 76 may conveniently be a white layer such as containing titanium dioxide pigments to provide a readily printable and aesthetically pleasing appearance. Outer layers 78 and 80 provide a tough outer surface and are conveniently fabricated of polyethylene, PVC, or similar materials. The outer layers 78 and 80 are bonded to the inner layers 74 and 76 to physically protect and to prevent alteration of information printed on the inner layers 74 and 76. The recording medium 82, adjacent an outer layer 78 of the master source document 70, is shown to comprise a flexible substrate 84 and a magnetizable coating 86 thereon. A desirable attribute of a permanent magnet material layer 72 formulated of "Plastiform" material is that the magnetic fields generated therein may be sufficiently intense to alter the magnetization in layer 86 of recording medium 82 even though the layer 86 is spaced from the layer 72 by the layers 74 and 78 or 76 and 80 and by a slight gap between members 70 and 82 such as resulting from the presence of entrapped air or a nonmagnetic carrier web therebetween.

In a preferred embodiment of the invention, the master source documents are uniformly magnetized in one polarity prior to encoding discrete magnetic patterns therein in the form of areas of reversed magnetization. FIGS. 3 and 4 show side and front views respectively of a magnetizer device 88 for uniformly magnetizing a master source document 10. The magnetizer device 88 comprises a plurality of permanent magnet sections 90, conveniently fabricated of "Plastiform" material, and uniformly premagnetized normal to the broad vertically illustrated faces shown in the side view. Twelve such sections 90 are shown in FIG. 3. The magnets 90 are shown assembled in sets of three such that the magnetic fields of the magnets in each set cooperate to form a single magnetic field. Two of the assembled sets are positioned to have the same polarity facing opposite sides of a center pole piece 92 while the remaining two sets are positioned to have the opposite polarity facing a similar pole piece 94. These members are further assembled together with end pole pieces 96 and 98 providing a low reluctance magnetic path. A gap is maintained between the center pole pieces 92 and 94 by nonmagnetic shims 100 extending a short distance along the length of each pole face 106 and 108, thereby resulting in a region of highly concentrated magnetic flux in the gap. The outer surface of pole pieces 92 and 94 are secured to nonmagnetic cover plates 102 and 104. An elongated opening 110, slightly larger than the gap between the pole pieces 92 and 94, is provided in each of the end pole pieces 96 and 98, to allow a master source document 10 to be inserted through the elongated openings 110 and through the gap between the shaped pole faces 106 and 108. The concentrated field in the gap is sufficient to reverse the magnetization state of a master source document 10 passed therethrough such that the entire document reaches a magnetically saturated state before exiting from the gap and remains in a state of maximum residual magnetization corresponding to the polarity of the magnetic field within the gap. The front view of the magnetizer 88 shown in FIG. 4 allows a clear view of the elongated opening 110 and the interior gap, with a master source document 10 passing therebetween.

FIG. 5 depicts a bottom view of the pole piece 16 and pole face 18 shown in FIG. 1B. Pole face 18 comprises an alphanumeric character and corresponding machine readable code in the form of a raised letter 19 and raised appropriately positioned and shaped posts 21.

FIG. 6 sets forth an alternative electromagnetic device for encoding a master source document 10, comprising a coil 112, a pole piece 114 having a pole face 116 and a low reluctance flux return member 12. To encode the master source document 10, a pulse of electrical current is passed through coil 112 to generate a pulsed magnetic field which is concentrated by the pole piece 114 through the pole face 116, thereby changing the magnetization of the master source document 10 positioned between the pole face 116 and the low reluctance flux return member 112.

FIG. 7 sets forth a cross sectional side view of an embodiment of the present invention wherein customer data encoded on a master source document 10 and transaction data provided by a transaction register device 118 are magnetically recorded onto a recording medium 22. The transaction register device 118 comprises a plurality of selectively energizable data generators in the form of a series of multifaceted drums 120, each drum 120 having on each facet 122 thereof a layer of permanent magnet material such as "Plastiform" material suitably encoded to represent a given alphanumeric character and/or standardized code representation thereof. In operation, each of the drums 120 is positioned by a control mechanism (not shown) to represent desired transaction data.

FIG. 8 pictures a cross sectional end view of one of the multifaceted drums 120 adjacent a recording medium 22, showing the layer of permanent magnetic material on each facet 122. In some embodiments, a layer of low magnetic reluctance material such as soft iron or permalloy will be present below each facet 122 to increase the field provided by the layer of permanent magnet material.

Additional external magnetic fields are not essential in order to magnetically record the encoded patterns from master source documents onto a recording medium. However, a superior recording system results if the system is alternatively designed such that an additional bias magnetic field is super-imposed with that provided by the master source document or transaction register device. Such an alternative system desirably uses a sufficiently thin sheet of permanent magnet material in the master source document or uses a high coercive force recording medium, such that the fields from the patterns on the master source document are insufficient to magnetize the recording medium unless the bias field is used. The primary advantage of such a system is that recording only occurs in the presence of the bias field while master source document and recording medium are in a fixed position adjacent each other. This prevents loss of magnetic resolution in the resultant recording as the master source document and recording medium are separated from each other. Also, the use of a thinner sheet of permanent magnet material in the master source document reduces its cost and bulkiness. A bias magnet 124 for providing such an additional bias field is shown in FIG. 7 to comprise a permanent magnet providing a magnetic field which reinforces the external magnetic fields representative of encoded data material. Such magnets are conveniently fabricated of "Plastiform" material. The bias magnet 124 is passed over the recording medium 22 when the medium is positioned adjacent a master source document 10 and/or transaction register device 118, and produces a supplementing magnetic field over a given area of the recording medium 22 to produce in areas corresponding to the encoded data a net magnetic field in excess of the coercive force of the recording medium 22. This leaves the magnetic state of each corresponding area of the recording medium in a state matching the magnetization pattern of the corresponding area in the master source document 10.

In alternative embodiments bias magnet 124 may comprise two or more sections having alternating magnetic polarities. When the bias magnet comprising such a plurality of sections is passed over the positioned document 10 and recording medium 22 a series of magnetic field reversals is produced which cycles the magnetic state of the magnetic recording medium through minor hysteresis loops to stabilize the resultant recording.

FIG. 9 is a side schematic view in elevation of magnetization patterns within a data bit line of a master source document 126 encoded to contain identification data and within an aligned data line of a master source document 127 encoded to contain transaction data. The aligned data bit lines in the master source documents 126 and 127 correspond to the data bit line 136 shown in the view of the recording medium 22 in FIG. 10. The polarities of the encoded magnetized areas along the illustrated data bit line of the master source documents 126 and 127 are shown by arrows pointing downward, and the background is shown to be uniformly magnetized by arrows pointing upward. A bias magnet 128 is shown as a tapered wedge of a series of permanent magnet sections each of which has a polarity opposite that of adjacent sections. As the bias magnet 128 is moved from left to right across a fixed point on the recording medium 22, the successive smaller segments in the wedge produce repeatedly reversing magnetic bias fields of decreasing intensity. These bias fields are superimposed on the constant magnetic fields from the master source documents 126 and 127, thereby promoting anhysteretic recording of the encoded pattern onto the adjacent recording medium 22.

FIG. 10 sets forth an embodiment of a recording medium 22 in the form of a conventional business record card. Encoded on the left portion thereof shown generally as 132 and made visible as though viewed through a magnetic viewing device, such as described in U.S. Pat. No. 3,013,206, are magnetized areas corresponding to customer identification data in the form of alphanumeric characters and corresponding ASCII code representations, such as would identify a customer, account number, credit rating, etc. In a similar manner, the right portion 134 of the card 22 shows as transaction data the price, date and type of merchandise or other coded information characteristic of a particular sale or transaction.

FIG. 11 sets forth an embodiment of the present invention wherein a master source document 138 is employed as a book identification tag affixed to the cover of a book 140. A permanent magnet layer is concealed below the surface of the document 138, while the call letters and numbers identifying the book 140 are printed on an outer portion thereof. An identifying code is magnetized in the concealed permanent magnet layer. In this embodiment, the recording medium is a web of magnetic recording tape 142 positioned between takeup and supply reels 144 and 146 carried on a hand operated positioning device 148 having a mechanism, not shown, for positioning the tape 142 adjacent the document 138 and for sequentially advancing a section of the tape 142 after each use.

This embodiment is useful in accumulating inventory data relating to objects such as library books, wherein each document carries a magnetized code characteristic of the object to which it is attached. During inventory of a given object, the tape 142 is positioned adjacent the document 138 and a recording of the magnetized code is thereby recorded onto the tape 142. The recording medium 142 may subsequently be processed as shown in FIG. 1D for obtaining an up-to-date inventory of the objects thus processed. In a similar manner, the system may be modified for co-positioning an encoded customer identification card, and a transaction register device adjacent the tape 142 to provide checkout data in addition to a running inventory. Other applications of this embodiment include the acquisition of encoded data on suitably tagged merchandise for general inventory purposes, automated accounting at the point of sale, etc.

FIG. 12 shows a typical magnetization pattern of a version of a magnetically encoded ferromagnetic sheet concealed in a document 138, as though viewed through a magnetic viewing device. The outer boundaries of the uniformly magnetized background portions are delineated by the field gradient produced transition regions 150 and 152. A typical code comprises an array of seven parallel regions 154, 156, 158, 160, 162, 164 and 166, uniformly spaced across the document 138, any one or more of which may be magnetized in a reverse direction from that of the surrounding background area. The pulses corresponding to the boundaries 150 and 152 may be utilized to initiate a timing circuit in the playback and signal preconditioner 30, having electronic gates allowing passage of signal pulses at time intervals corresponding to the normal appearance of pulses resulting from the presence of a magnetized pattern at the seven parallel regions 154, 156, 158, 160, 162, 164 and 166. Thus, the absence of a pulse within a given time gate may be recognized as a binary "0" and the presence of a pulse at any of the time gates as a binary "1".

The document 138 is shown adjacent the tape 142 in FIG. 13, wherein the presence of encoded reverse magnetized regions 156, 158, 162 and 166 are shown by corresponding arrows directed downward.

FIG. 14 represents an oscillogram of electrical pulses produced on playback of the tape 142 onto which the magnetization patterns shown on document 138 were earlier recorded. Trigger pulses 172, 174, 176 and 178 correspond to the reverse magnetized regions 156, 158, 162 and 166 respectively.

FIG. 15 illustrates magnetization patterns which may be obtained with the use of particular types of magnetic recording media. FIG. 15A shows a cross section of a typical magnetization pattern of a master source document 180 wherein the background regions 181 are magnetized vertically upward and wherein a data bit 182 is shown magnetized vertically downward. The corresponding lines of flux are schematically indicated as 184. FIG. 15B is illustrative of a magnetic recording medium 186 wherein unoriented magnetic particles are coated in an organic binder. Exposure to the field provided by the magnetized bit 182 produces a resultant recorded magnetic bit 190 in the medium 186, having both downward, sideward and upward magnetized regions corresponding with the lines of flux 184. Such non-uniformity in the magnetized region expands the width of the recorded bit and causes a decreased resolution and amplitude in the reproduced electrical signals. Preferred recording media are shown in FIGS. 15C and D. FIG. 15C illustrates the magnetization patterns in a recording medium 192 having magnetic particles oriented normal to the major surface of the transfer sheet 192. When exposed to the field provided by the magnetized bit 182 of the master source document 180, the particles become magnetized in response to the vertical components of the magnetic lines of flux 184 and result in a recorded bit 194 having an area closely approximating that of the magnetized bit area 182, thus allowing a minimum spacing of magnetized bits and a resultant maximum allowed density of coded regions. FIG. 15D shows a recording medium 196 having magnetic particles oriented such that the easy direction of magnetization is parallel to the surface of the recording medium 196, such as is employed with conventional magnetic recording media. Upon exposure to the field provided by the magnetized bit 182 of the master source document 180 the particles in the recording medium 196 become magnetized in response to the horizontal components of the magnetic flux 184, thereby resulting in an expanded magnetized bit area 198, which limits the bit density obtainable using such media, but in which sharply defined boundaries defining the magnetized areas still exist.

Having thus described the present invention, what is claimed is:

1. A method of accumulating data for processing in electronic data processing equipment, wherein a master source document is magnetized in a discrete pattern to provide external magnetic fields representative of data related to said document, a recording medium susceptible to said external magnetic fields is momentarily positioned adjacent the master source document to magnetically record said pattern onto the recording medium and said pattern is subsequently sensed from the recording medium to produce an electrical signal representative of said data for electronic data processing, characterized by the steps of providing as said master source document a homogeneous sheet of particulate permanet magnet material in a flexible binder for enabling said magnetization in a discrete pattern throughout the sheet, said sheet having a coercive force of not less than 1000 oersteds and a maximum energy product of not less than $5 \times 10^5$ gauss-oersteds for enabling said document to provide external magnetic fields which can be sufficiently intense to allow the magnetic recording of said patterns onto the recording medium even though the master source document and the recording medium are not in intimate contact, providing a magnetic recording tape as the recording medium, supporting the tape in a transport path, sequentially advancing successive lengths of the tape along the path, and positioning a said length of the tape adjacent a said master source document when the tape is stationary within said path.

2. A method of accumulating data for processing in electronic data processing equipment, wherein a master source document is magnetized in a discrete pattern to provide external magnetic fields representative of data related to said document, a recording medium susceptible to said external magnetic fields is momentarily positioned adjacent the master source document to magnetically record said pattern onto the recording medium and said pattern is subsequently sensed from the recording medium to produce an electrical signal representative of said data for electronic data processing, characterized by the steps of providing as said master source document a homogeneous sheet of particulate permanent magnet material in a flexible binder for enabling said magnetization in a discrete pattern throughout the sheet, said sheet having a coercive force of not less than 1000 oersteds and a maximum energy product of not less than $5 \times 10^5$ gauss-oersteds for enabling said document to provide external magnetic field which can be sufficiently intense to allow the magnetic recording of said patterns onto the recording medium even though the master source document and the recording medium are not in intimate contact, magnetizing the master source document to provide a said discrete external magnetic field pattern of one polarity and a remaining background area in the document of an opposite polarity, and producing an alternating polarity magnetic bias field for alternately reinforcing and opposing said external magnetic fields of the master source document when the document is positioned adjacent the recording medium to promote recording said data onto the recording medium.

3. A method of accumulating data for processing in electronic data processing equipment, wherein a master source document is magnetized in a discrete pattern to provide external magnetic fields representative of data related to said document, a recording medium susceptible to said external magnetic fields is momentarily positioned adjacent the master source document to magnetically record said pattern onto the recording medium and said pattern is subsequently sensed from the recording medium to produce an electrical signal representative of said data for electronic data processing, characterized by the steps of providing as said master source document a homogeneous sheet of particulate permanent magnet material in a flexible binder for enabling said magnetization in a discrete pattern throughout the sheet, said sheet having a coercive force of not less than 1000 oersteds and a maximum energy product of not less than $5 \times 10^5$ gauss-oersteds for enabling said document to provide external magnetic fields which can be sufficiently intense to allow the magnetic recording of said patterns onto the recording medium even though the master source document and the recording medium are not in intimate contact, providing a variable data register comprising a plurality of selectably positionable magnetic field sources for providing external magnetic field patterns representative of variably selected data, selectively positioning the field sources to select variable data related field patterns for recording in a predetermined relationship with said field pattern related to the master source document, and momentarily positioning the recording medium adjacent the register and the master source document to magnetically record onto the recording medium said variable data related patterns in a predetermined relationship with said recorded pattern representative of data related to the source document.

4. A system for accumulating data for processing in electronic data processing equipment, wherein a master source document is magnetized in a discrete pattern to provide external magnetic fields representative of data related to said document, a recording medium susceptible to said external magnetic fields is momentarily positioned adjacent the master source document to magnetically record said pattern onto the recording medium and said pattern is subsequently sensed from the recording medium to produce an electrical signal representative of said data for electronic data processing, characterized by the master source document comprising a homogeneous sheet of particulate permanent magnet material in a flexible binder for enabling said magnetization in a discrete pattern throughout the sheet, said sheet having a coercive force of not less than 1000 oersteds and a maximum energy product of not less than $5 \times 10^5$ gauss-oersteds for enabling said document to provide external magnetic fields which can be sufficiently intense to allow the magnetic recording of said patterns onto the recording medium even though the master source document and the recording medium are not in intimate contact, by the master source document being magnetized to provide a said discrete external magnetic field pattern of one polarity and a remaining background area in the document of an opposite polarity, and by the system further comprising a source of an alternating polarity magnetic bias field for alternately reinforcing and opposing said external magnetic fields of the master source document when the document is positioned adjacent the recording medium to promote recording said data onto the recording medium.

5. A system for accumulating data for processing in electronic data processing equipment, wherein a master source document is magnetized in a discrete pattern to provide external magnetic fields representative of data related to said document, a recording medium susceptible to said external magnetic fields is momentarily positioned adjacent the master source document to magnetically record said pattern onto the recording medium and said pattern is subsequently sensed from the recording medium to produce an electrical signal representative of said data for electronic data processing, characterized by the master source document comprising a homogeneous sheet of particulate permanent magnet material in a flexible binder for enabling said magnetization in a discrete pattern throughout the sheet, said sheet having a coercive force of not less than 1000 oersteds and a maximum energy product of not less than $5 \times 10^5$ gauss-oersteds for enabling said document to provide external magnetic fields which can be sufficiently intense to allow the magnetic recording of said patterns onto the recording medium even though the master source document and the recording medium are not in intimate contact, by the recording medium comprising a magnetic recording tape, and by the system further comprising a device for supporting the tape in a transport path and for sequentially advancing successive lengths of the tape along the path to enable positioning of a said length of the tape adjacent a said master source document when the tape is stationary within said path.

6. A system for accumulating data for processing in electronic data processing equipment, wherein a master source document is magnetized in a discrete pattern to provide external magnetic fields representative of data related to said document, a recording medium susceptible to said external magnetic fields is momentarily positioned adjacent the master source document to magnetically record said pattern onto the recording medium and said pattern is subsequently sensed from the recording medium to produce an electrical signal representative of said data for electronic data processing, characterized by the master source document comprising a homogeneous sheet of particulate permanent magnet material in a flexible binder for enabling said magnetization in a discrete pattern throughout the sheet, said sheet having a coercive force of not less than 1000 oersteds and a maximum energy product of not less than $5 \times 10^5$ gauss-oersteds for enabling said document to provide external magnetic fields which can be sufficiently intense to allow the magnetic recording of said patterns onto the recording medium even though the master source document and the recording medium are not in intimate contact, and by a variable data register comprising a plurality of selectably positionable magnetic field sources for providing external magnetic field patterns representative of variably selected data, which field sources may be selectively positioned to select variable data related field patterns for recording in a predetermined relationship with said field pattern related to the master source document when the recording medium is momentarily positioned adjacent the register in a predetermined relationship with the positioning of the master source document to thereby magnetically record onto the recording medium said variable data related patterns in a predetermined relationship with said recorded pattern representative of data related to the source document.

* * * * *